United States Patent [19]

Wolk

[11] Patent Number: 4,629,888
[45] Date of Patent: Dec. 16, 1986

[54] WELL LOGGING TOOL FOR HOT WELL BORES

[76] Inventor: Piero Wolk, 1717 Brittmore, Houston, Tex. 77043

[21] Appl. No.: 788,951

[22] Filed: Oct. 18, 1985

[51] Int. Cl.⁴ .............................................. G01V 5/00
[52] U.S. Cl. .................................... 250/256; 250/267; 62/260
[58] Field of Search .................... 250/256, 267, 352; 62/259.2, 260

[56] References Cited

U.S. PATENT DOCUMENTS 2,862,106 11/1958 Scherbatskoy ...................... 250/267
4,503,327 3/1985 Wilson ................................. 250/267

Primary Examiner—Janice A. Howell
Attorney, Agent, or Firm—Guy E. Matthews

[57] ABSTRACT

Apparatus for insulating enclosed electronic devices against damaging temperatures when used in deep, hot well bores. Includes a first vacuum chamber insulating means defined by outer casing of well-logging tool and inner casing. First vacuum chamber defines a components chamber to shield contents against the temperature in a well bore. A second vacuum chamber mounted within components chamber is defined by an outer tube and an inner tube. Outer tube has a thickened wall and is of material suited to serve as heat sink within components chamber. Second vacuum chamber defines detection chamber to shield contents against the temperature within components chamber. Thickened wall is undercut to define a thin wall adapted to function as a window for radiation to pass from an earth formation outside said logging tool into a radiation detector disposed within said detection chamber. Further includes radiation screen located in said undercut and around said window to shield said detector means from radiation below a selected level of energy.

14 Claims, 2 Drawing Figures

4,629,888

WELL LOGGING TOOL FOR HOT WELL BORES

FIELD OF THE INVENTION

This invention generally pertains to means for preventing the overheating of the heat sensitive components utilized in deep and hot well bores and more particularly pertains to a vacuum flask combination for protecting subsurface electronic components below a prescribed temperature range and for protecting more sensitive scintillation detection components to a substantially lower prescribed temperature.

BACKGROUND OF THE INVENTION

As shown by the prior art patents below referenced, there has been a substantial amount of work done toward protecting electronic components in hot, deep well bores. Various coolants have been proposed and used as well as both liquid and solid eutectic materials. These materials are normally termed "heat sinks" or heat sponges which purpose is to absorb the heat generated both internally from the electronics and externally from transmission of heat from the well bore through the side walls of the logging apparatus. Materials with high specific heat are commonly used. Also, solid materials having appropriate melting temperatures are utilized to take advantage of their heat of fusion.

The vacuum or "Dewar" flask has been extensively used in downhole tools, often in combination with heat sink devices as mentioned above.

The environment encountered in well bores reaches elevated temperatures which are considerable in deep wells and in certain geographical locations. Temperatures approaching 600° F. are encountered. Present efforts are to provide electronic components which will operate satisfactorily in temperatures up to 400° F., at least for a limited time period of operation. Generally the lower temperature at which electronic components can be maintained during well bore operations than the longer and more reliable are the operation of such components.

Scintillation detection devices, which employ scintillation crystals coupled to a photomultipler tube or device will deteriorate rapidly to an inoperative state at elevated temperatures much lower than the usual electronic components.

The electronic components are desirably maintained in a dry gaseous environment such as air or nitrogen since the insulation and wiring of such components are susceptible to leaching by any sort of liquid, such as refrigerant, which in turn can lead to component failure.

Presently known prior art patents relating to this invention are as follows: U.S. Pat. Nos. 2,469,461, 2,561,738, 3,038,075, 3,187,824, 3,254,221, 3,321,625, 3,435,629, 3,521,063, 3,654,470, 3,714,981, 4,056,949, 4,107,937, 4,120,353, 4,169,387, 4,407,136, 4,480,186, 4,485,670.

OBJECTS OF THE INVENTION

A principle object of this invention it to maintain a first maximum temperature level within a well tool to preserve electronic components from heat deterioration and to maintain a yet lower maximum temperature level for detection components more susceptible to heat deterioration with combination apparatus integrated for use in the well tool.

Another object of this invention is to provide a well logging tool wherein the outer shell or housing or casing of the tool serves as a portion of the temperature maintaining apparatus.

Yet another object of the invention it to provide apparatus which will withstand considerable longitudinal and lateral shock during use of the well logging tool, yet remain in operative condition.

SUMMARY OF THE INVENTION

The above and other objects of the invention are attained by apparatus incorporated into a well-logging tool for insulating enclosed electronic devices against damaging temperatures when used in deep, hot well bores. Including a first vacuum chamber defining a components chamber insulated by the first vacuum chamber to shield its contents against the temperature in a well bore and a second vacuum chamber mounted within the components chamber and defined by an outer tube and an inner tube. The outer tube has a thickened wall and is of a material suited to serve as a heat sink within said components chamber. The second vacuum chamber defines a detection chamber insulated by the second vacuum chamber to shield its contents against the temperature within the components chamber. The thickened wall of the outer tube is undercut to define a thin wall adapted to function as a window for radiation to pass from an earth formation outside the logging tool into a radiation detector disposed within the detection chamber. A radiation screen may be located in the undercut and around the window to shield the detector means for radiation below a selected level of energy. A scintillation detector means is located within the detection chamber and electrically connected to electronics components located within the component chamber.

DESCRIPTION OF THE PREFERRED EMBODIMENT

Figure 1:
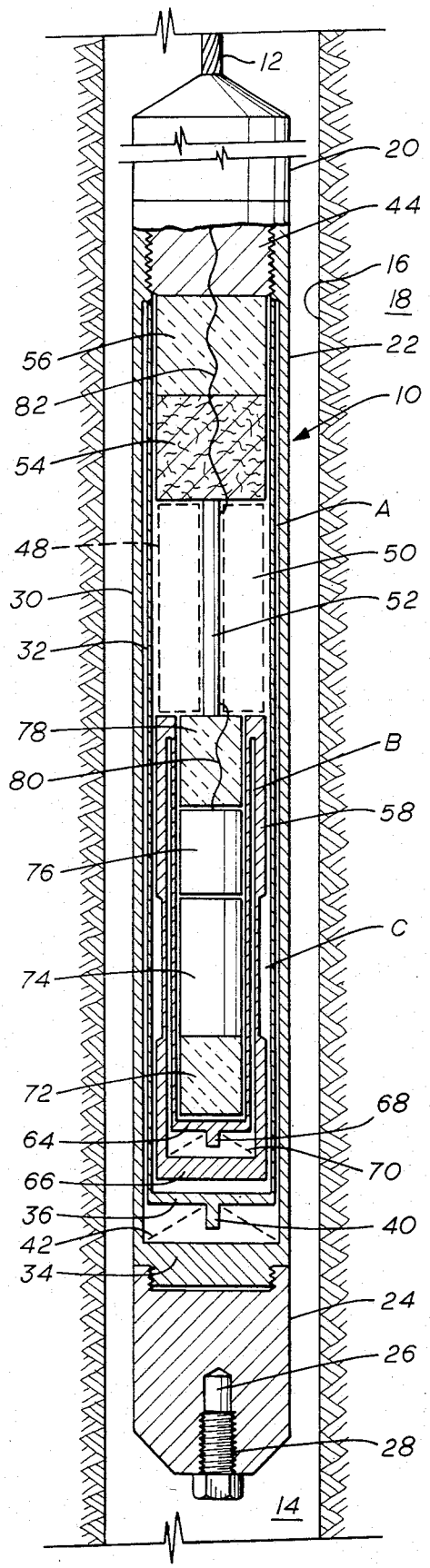
FIG. 1 is a longitudinal cross-section of a well logging tool as situated immersed in drilling mud in the uncased portion of a well bore.

Looking to FIG. 1, there is shown a well logging tool 10 suspended from a stranded well logging cable 12 as commonly provided with a plurality of electrical conductors. Tool 10 is shown immersed in well drilling fluid or mud 14 which fills a well bore 16 drilled down into an earth formation 18. The tool 10 includes an upper instrument section 20 and a lower radiation detection section 22.

Optionally attached to the lower end of detection section 22, for illustration, is a radioactive source section 24 which carries a radioactive source 26 retained in the section 24 by a retainer plug 28.

As later explained, if the detector carried by the radiation detection section 22 is provided to detect radiation naturally occurring from earth formation 18, then the tool of the present invention would work equally as well with a plain end nose rather than the section 24 as above described.

Figure 2:
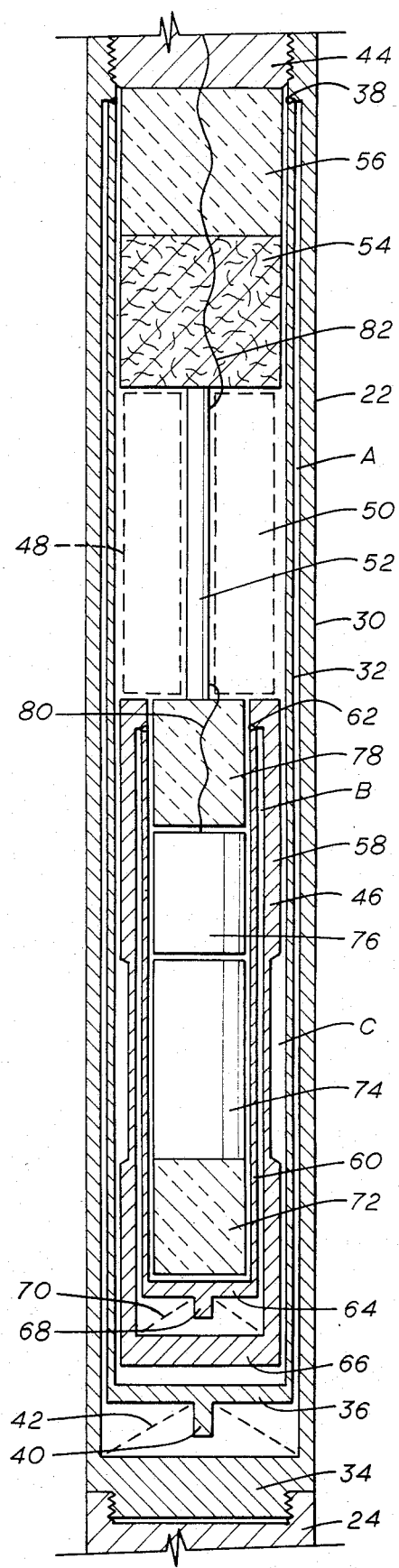
FIG. 2 is a longitudinal cross-section of a portion of the tool shown in FIG. 1 and enlarged to more clearly illustrate the structure of the vacuum chambers of the present invention.

Referring to FIGS. 1 and 2, there are shown three cavities or chambers A, B and C defined by members of the radiation detection section 22.

Chamber A is an insulating vacuum chamber defined by the outer tool housing or casing 30, and an inner tool housing 32. The outer casing 32 terminates at its lower end with a bulkhead 34 and the inner casing 32 terminates at its lower end with a bulkhead 36. The tool housings 30 and 32 are connected into sealed relation, as by a weld 38, to define the annular chamber A which is enclosed at its lower end by the bulkheads 34 and 36. As shown, the bulkhead 36 is provided with a concentric stud or pin 40 which forms a central mount for a schematically shown shock and stabilizing mount 42 which extends outwardly and downwardly into supporting contact with the inner wall of the tool casing 30. The assembly thus defining the vacuum chamber A is an integral shock resistant assembly capable of maintaining a high vacuum.

Mounted closely within the inner casing 32 is a closely fitting and removable assembly having structural connection (not shown) and retained by a threaded upper plug 44 which also serves as a coupling for threaded connection into the upper section 20.

Generally, such assembly includes a vacuum insulated radiation detection unit 46 at the lower end, an electronics section 48 including electronics units 50 supported from a spine 52, a heat sink 54 confined by an insulator 56 at the upper end.

The radiation detection unit 46 includes the cavity or chamber B which is defined by an outer tube 59 and an inner tube 60 as an annular space. At the upper end, the inner tube 60 is joined with outer tube 58, as by a weld 62, which firmly connects tube 60 with tube 58 in sealed relationship. A bulkhead 64 is formed at the bottom of tube 60 and a bulkhead 66 is formed at the bottom of tube 58 to complete the sealed enclosure of vacuum chamber B.

Bulkhead 64 is provided with a concentric stud 68 which serves to centralize tube 60 with a shock and stabilizing mounting 70 schematically shown as extending from the stud 68 downwardly and outwardly into contact with the inner walls of the tube 58.

By virtue of the snug fit of the radiation detection unit 46 within the inner casing 32, and of the shock mount 70, the assembly which defines the chamber B is also provided as a rugged and shock resistant part of the overall assembly. Means (not shown) is provided between the bulk heads 36 and 66 to prevent longitudinal shock between these bulkheads. Mounted within the inner tube 60 as shown is a lower shock and insulator member 72 which supports a scintillation crystal 74. Crystal 74 is optically coupled to a photomultiplier detection unit 76 with the detection unit being connected in with the electronics 50 through conductors 80.

Closing off the open end of the inner tube 60 above detection unit 76 is an insulator member 78.

As seen also, the electronics unit 48 is connected up through the plug 44 and ultimately into the logging cable 12 through conductors 82.

It is to be noted that the outer tube 58 is provided of comparatively thick material such as stainless steel, for example, to also serve as a heat sink for the inner chamber enclosed by the inner tool casing 32. Also seen is that the thickened wall of the outer tube 58 is undercut in the vicinity of the scintillation crystal 74 to form the cavity or chamber C.

The purpose of chamber C is two-fold. One purpose is to reduce the shielding which would block radiation coming toward the crystal 74 from the surrounding earth formation 18. The second purpose is to provide room for selective shielding screens (not shown) to permit the crystal 74 to receive radiation of selected or prescribed energy level. Such screens might be provided of cadmium, copper, iron, nickel, silver and tin as examples.

The radiation source 26 may be a Ceisum 131, (Ce 131) source for producing gamma rays whereby the crystal 74 would be picking up gamma rays induced by said radiated gamma rays (in addition to the natural gamma rays from the formation). Another source could be an Americium Berillium 124 (AmBe) source which would emit neutrons into the formation 18 whereby the crystal 74 could pick up and detect gamma rays generated by such neutrons. Appropriate shields (not shown) around the outer tube 58 and within the cavity C would be selected for such operation.

In operation the tool 10 would be assembled as shown in FIG. 1 at ambient temperature (72° F.) or below with the heat sink 54 and the heat sink of outer tube 58 being at such ambient temperature. The tool is then attached to the well logging cable 12 of a surface located well logging unit (not shown), then run through check procedures to ensure proper operation, and thereafter lowered into a well bore adjacent to a zone of formation 18 which is to be logged (measured) by the tool 10.

The tool 10 is first lowered to the lowermost part of the zone to be investigated and thereafter pulled slowly up the well bore at a substantially constant rate of movement while the detector crystal 74 and photomultiplier unit 76 are counting the relative rate of radiation emissions from the formation into the detector crystal 74. This counting rate is passed into the electronic package 48 which generates an appropriate signal or signals derived from the counting rate (and possibly pulse height) with such signals being transmitted to the earth surface for subsequent recording or logging.

Radiation detection crystals may be provided of sodium iodide, cesium iodide, or bismuth germanate, for example. Sodium iodide has been found to have the best energy resolution, but both cesium iodide and bismuth germanate provide better counting efficiencies.

Further information on such logging systems may be had by reference to U.S. Pat. Nos. 2,761,977, 3,038,075, 3,321,625, 3,521,063 and 3,654,470, all incorporated herein by reference.

While a preferred embodiment of the invention has been illustrated herein, it is to be understood that other modifications and changes can be made therefrom without departing from the spirit of the invention as limited only by the purview of the appended claims.

What is claimed is:

1. Apparatus incorporated into a well-logging tool for insulating enclosed electronic devices against heat damaging temperatures when used in deep hot well bores, comprising:
    (a) a first vacuum chamber insulating means defined by
        (1) the outer casing of a section of the well-logging tool formed into a first bulkhead at its lower end;
        (2) an inner casing disposed to
            (i) define a first annular chamber within said outer casing, (ii) be formed into a second bulkhead at its lower end in spaced apart relation from said first bulkhead, and
(iii) be connected in sealed relationship at its upper end with the upper said end of said outer casing;
(3) a shock and stabilizing means mounted between said first bulkhead and said second bulkhead;
(b) said first vacuum chamber defining a components chamber insulated by said first vacuum chamber to shield its contents against the temperature in a well bore;
(c) a second vacuum chamber mounted within said components chamber and defined by
(1) an outer tube formed into a third bulkhead at its lower end;
(2) an inner tube disposed to
(i) define a second annular chamber within said outer tube,
(ii) be formed into a fourth bulkhead at its lower end in spaced apart relation from said third bulkhead, and
(iii) be connected at its upper end in sealed relation with the upper end of said outer tube;
(3) a shock and stabilizing means mounted between said third bulkhead and said fourth bulkhead;
(d) said second vacuum chamber defining a detection chamber insulated by said second vacuum chamber to shield its contents against the temperature within said components chamber.

2. The apparatus of claim 1 wherein said outer tube has a thickened wall and is comprised of a material suited to serve as a heat sink within said components chamber.

3. The apparatus of claim 2 wherein said thickened wall of said outer tube is undercut to define a thin wall adapted to function as a window for radiation to pass from an earth formation outside said logging tool into a radiation detector disposed within said detection chamber.

4. The apparatus of claim 3 further including a radiation screen means located in said undercut and around said window to shield said detector means from radiation below a selected level of energy.

5. The apparatus of claim 1 further including a heat sink mass of appropriate size and configuration mounted within said component chamber along with the other contents of said component chamber.

6. The apparatus of claim 1 further including a scintillation detector means located within said detection chamber and electrically connected to electronics components located within said component chamber.

7. The apparatus of claim 1 further including insulating means closing off said detection chamber to insulate said detection chamber from the temperatures within said components chamber.

8. The apparatus of claim 4 further including a scintillation detector means located within said detection chamber and electrically connected to electronics components located within said component chamber.

9. The apparatus of claim 8 further including insulating means closing off said detection chamber to insulate said detection chamber from the temperatures within said components chamber.

10. The apparatus of claim 9 further including a heat sink mass of appropriate size and configuration mounted within said component chamber along with the other contents of said component chamber.

11. The apparatus of claim 10 wherein said outer tube has a thickened wall and is comprised of a material suited to serve as a heat sink within said components chamber.

12. The apparatus of claim 2 wherein said second bulkhead and said third bulkhead are mounted in shock resisting relationship.

13. The apparatus of claim 11 wherein said second bulkhead and said third bulkhead are mounted in shock resisting relationship.

14. The apparatus of claim 3 further including a scintillation detector means located within said detection chamber and electrically connected to electronics components located within said component chamber.

* * * * *